Figure 1:
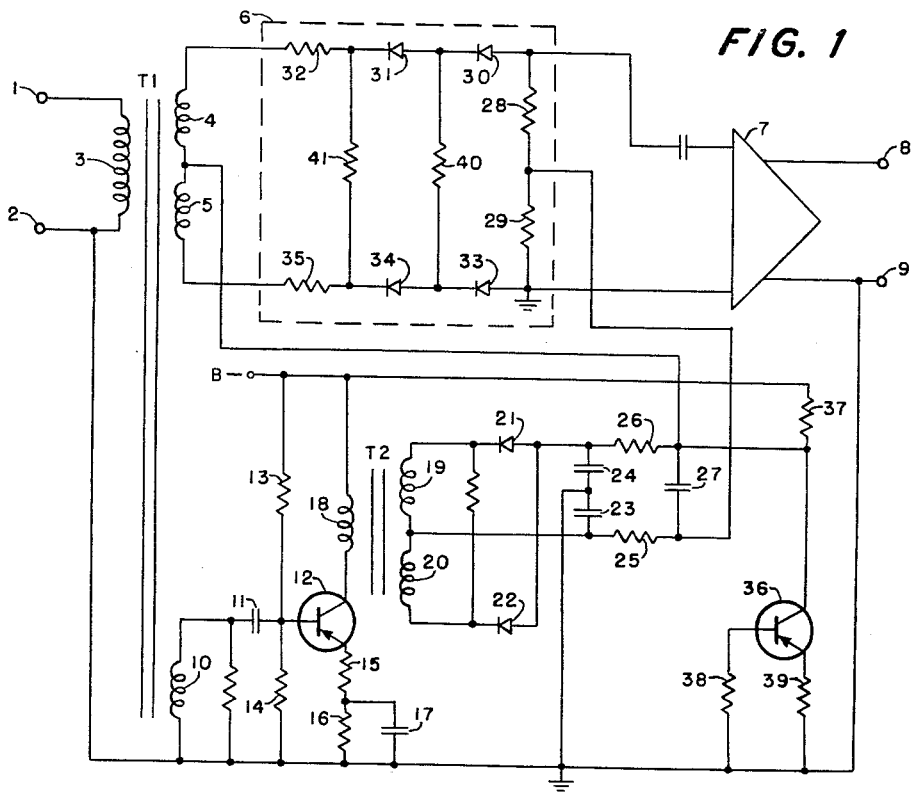

Aug. 29, 1961     A. F. PERKINS     2,998,563

TEMPERATURE COMPENSATING CIRCUIT

Filed March 27, 1958

INVENTOR.
ARTHUR F. PERKINS
BY
*F. H. Henson*
ATTORNEY.

2,998,563
TEMPERATURE COMPENSATING CIRCUIT
Arthur F. Perkins, Brewerton, N.Y., assignor to General Dynamics Corporation, Rochester, N.Y., a corporation of Delaware
Filed Mar. 27, 1958, Ser. No. 724,295
8 Claims. (Cl. 323—64)

This invention relates in general to electrical circuits and, more particularly, to temperature compensating circuits for offsetting the effects of variations in impedance introduced by changes of ambient temperature in electrical circuits.

Although its use is not limited thereto, the temperature compensating circuit herein disclosed is particularly adapted to compensate for temperature induced variations in the impedance of the semiconductor diodes forming a variolosser in an expandor circuit. As is well known in the art, an improved signal-to-noise ratio is achieved in transmission systems by compressing the amplitude of signals transmitted from the transmitting terminal and by then expanding signals received at the receiving terminal to their original amplitude. Conventionally, the received signals are coupled to the input of a variolosser and to the input of a control circuit in the expandor at the receiving terminal. The control circuit serves to rectify the signals applied thereto and to apply the resulting rectified signals, which are proportional to the volume of the received signals, to the variolosser to regulate the impedance of said variolosser. In recent years, semiconductor diodes have been used as the variable impedance elements in expandor variolosser circuits and the rectified signals produced by the control circuit have been used to apply variable forward bias to said diodes. Since the amplitude of the rectified signals is proportional to the volume of the received signals, received signals of high volume pass through the variolosser with proportionately less attenuation than do received signals of low volume.

Compressors and expandors utilizing semiconductor diodes as the principal elements of the variolossers included therein function satisfactorily when located in telephone exchange buildings where the ambient temperature is maintained within definite limits. However, when compressor and expandor circuits of the above described type are used in subscriber carrier applications where they are pole mounted and are thus subject to a wide range of ambient temperature, some form of temperature compensation is required to offset the temperature induced variations in impedance of the diodes.

Accordingly, it is the general object of this invention to provide a new and improved temperature compensating circuit for offsetting the effects of variations in impedance introduced by changes of ambient temperature in electrical circuits.

It is a more particular object of this invention to provide a new and improved temperature compensating circuit for offsetting the effects of variations in impedance introduced by changes of ambient temperature in variolosser circuits utilizing semiconductor diodes as the principal elements thereof.

In accordance with the present invention, the temperature compensating circuit produces a compensating current flow through the load or variolosser diodes at low ambient temperatures, which compensating current flow aids the current flow produced by the main power source or control circuit, the compensating current flow through the load circuit is reduced to zero as the ambient temperature increases, and the current flow through the load circuit produced by the main power source is then reduced as the ambient temperature further increases. The temperature compensating circuit comprises a transistor having its base returned to a point of reference or ground potential through a resistor, its emitter returned to ground potential through a resistor, its collector returned to a source of potential through a resistor, and its collector connected to the load. Since the base and emitter electrodes of the temperature compensating transistor are both returned to ground potential, no external bias is applied to those electrodes and at low ambient temperature, compensating current flow is produced in the load through the collector resistor to the source of potential. As the ambient temperature increases, the collector cut-off current $I_{co}$ begins to increase the transistor, is augmented by emitter current $\alpha I_E$, and the compensating current flow through the load is reduced. As the ambient temperature further increases, the compensating current flow through the load is reduced to zero and the transistor then acts as a shunt to the load. The emitter is returned to ground potential through a resistor to prevent over-compensation at high ambient temperatures.

Further objects and advantages of the invention will become apparent as the following description proceeds, and features of novelty which characterize the invention will be pointed out in hte claims annexed to and forming a part of this specification.

For a better understanding of the invention, reference may be had to the accompanying drawing which comprises two figures on a single sheet.

Figure 2:
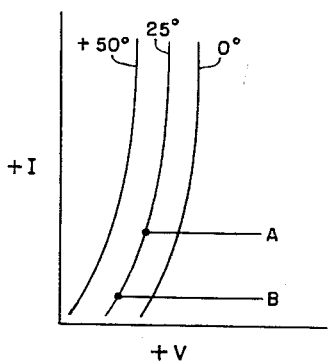

FIG. 1 shows an expandor circuit comprising a temperature compensating circuit, and FIG. 2 graphically illustrates characteristics of a PN point contact diode suitable for use in the variolosser portion of the expandor circuit shown in FIG. 1.

The operation of the expandor circuit, in which it has been chosen to illustrate the present invention, will first be described. Referring to FIG. 1, the received amplitude compressed signals are applied to input terminals 1 and 2 of the expandor and thus across primary winding 3 of input transformer T1. A portion of the received signal is induced in secondary windings 4 and 5 of transformer T1 and coupled through variolosser 6 and amplifier 7 to output terminals 8 and 9. The portion of the received signal appearing across secondary winding 10 of transformer T1 is coupled through capacitor 11 to the base of common emitter amplifier transistor 12. Base operating bias is obtained for amplifier transistor 12 through resistor 13 to the source of potential labeled B—, which may be minus forty-eight volts, and through resistor 14 to a point of reference or ground potential. Gain stabilization for the amplifier is provided by the negative feedback voltage developed across emitter resistor 15 and temperature stabilization is provided by resistor 16 which is bypassed for A.-C. signals by capacitor 17.

The amplified signals appearing in the collector circuit of transistor 12 and thus in primary winding 18 of transformer T2 are inductively coupled to the secondary windings 19 and 20 of transformer T2 and are rectified by diodes 21 and 22 to produce a D.-C. voltage, the amplitude of which is proportional to the amplitude of the received signal. The filter comprising capacitors 23 and 24, resistors 25 and 26, and capacitor 27 performs several functions in the circuit. Capacitors 23 and 24 in conjunction with resistors 25 and 26 serve to decouple any A.-C. signals appearing at the anode terminals of diodes 21 and 22, while capacitor 27 performs the dual function of determining the operate and hangover time (approximately fifteen milliseconds) of the circuit and of providing an A.-C. shunt between the junction of secondary windings 4 and 5 of transformer T1 and the junction point of series connected resistors 28 and 29 to correct for any unbalance produced by variolosser 6. When capacitor 27 becomes charged, direct current flows from positive potential at the lower terminal of capacitor 27 through resistor 28, diode 30, diode 31, resistor 32, and the secondary winding 4 of transformer T1 in parallel with resistor 29, diode 33, diode 34, resistor 35, and secondary winding 5 of transformer T1 and then back-to-negative potential at the upper terminal of capacitor 27. It is to be noted that this current flow through the variolosser is in the forward direction insofar as diodes 30, 31, 33, and 34 are concerned.

It is believed that the operation of the variolosser can best be described by referring to FIG. 2 which shows the forward characteristic of a point contact diode. The circuit is so designed that the forward current flow produced by the control circuit in response to the receipt of a maximum volume signal operates the variolosser diodes at point A on their characteristic curves, a minimum volume signal operates the variolosser diodes at point B on their characteristic curves, and intermediate volume signals, of course, operate the variolosser diodes at points intermediate points A and B on their characteristic curves. Since the slope of the characteristic curve at point A is greater than the slope of the curve at point B, the dynamic impedance presented to the A.-C. signals coupled to the variolosser is less for high volume signals than for low volume signals. Therefore, received signals of high volume are attenuated less than received signals of low volume in their passage through the variolosser and the signals appearing at the output terminals 8 and 9 are expanded in volume as compared to the signals received at terminals 1 and 2.

Referring to FIG. 2, it can be seen that variations in ambient temperature have very little effect on the shape of the characteristic curves but that the curves are shifted horizontally. This shows that the D.-C. resistance increases with decreases in temperature or decreases with increases in temperature while the dynamic impedance presented to A.-C. signals is little changed if the D.-C. forward current through the diodes can be maintained constant regardless of the ambient temperature.

The purpose of the temperature compensating circuit, which comprises transistor 36 and resistor 37, is to control the current which flows between the collector of transistor 36 and the upper terminal of capacitor 27 as a function of temperature and thus control the forward current supplied to the variolosser diodes. The current flowing in resistor 37 is determined primarily by the magnitude of the B— voltage, which as previously mentioned may be minus forty-eight volts, since in the illustrated embodiment of the invention the collector voltage of transistor 36 is near ground potential. That is, the negative rectified signals appearing at the upper terminal of capacitor 27 and thus at the collector of transistor 36 vary from a magnitude of a few millivolts to a magnitude of approximately one volt. The current required by the collector of transistor 36 is determined by the following equations:

Let $I_L$ = Current which flows between the collector of transistor 36 and the upper terminal of capacitor 27.
$I_C$ = Collector current of transistor 36.
$I_E$ = Emitter current of transistor 36.
$E_B$ = Potential of the base of transistor 36.
$I_{co}$ = Collector cutoff current of transistor 36.
$\alpha$ = Emitter to collector amplification factor of transistor 36.

Equation:

(1) $\quad I_C = \alpha I_E + I_{co}$ (2) $\quad I_E = \dfrac{E_B}{R39}$ (3) $\quad E_B = I_{co} R38$ The collector cutoff current $I_{co}$ of a semiconductor device is a function of temperature. Voltage has little effect below the zener or breakdown region. Since $I_{co}$ is a function of temperature, it can be seen from the above equations that $I_C$ is a function of temperature and that the shape of $I_C$ is a function of temperature and that the shape of $I_c$ is determined by the values of $I_{co}$, R38, and R39. $I_L$ is determined by the equation:

(4) $\quad I_C = IR37 \pm I_L$ and (4A) $\quad \pm I_L = I_C - IR37$

Since IR37 is constant, $I_L$ is a function of $I_C$ which, as shown above, is a function of temperature.

At very low ambient temperatures, the current $I_{co}$ is virtually zero and a compensating current flow is produced through the load which aids the current flow through the load produced by the control circuit. The compensating current flow is from ground through diode 33, diode 34, resistor 35, secondary winding 5 of transformer T1 in parallel with resistor 29, resistor 28, diode 30, diode 31, resistor 32, and secondary winding 4 of transformer T1, and then through resistor 37 to potential source B—. As the ambient temperature increases, $I_{co}$ and $\alpha I_E$ increase and the collector current of transistor 36 reduces the compensating current flow by an increasing amount. At approximately 25° C., the current shunted through transistor 36 equals the current flow through the resistor 37 and there is no current flow between the upper terminal of capacitor 27 and the collector of transistor 36. As the ambient temperature further increases, the collector current of transistor 36 reduces the current flow through the load produced by the control circuit since the control circuit is essentially a constant current source at a given signal input level. The current flow is from the collector of transistor 36 to the upper terminal of capacitor 27 and the lower terminal of capacitor 27 is returned to ground potential through resistor 29 to complete the circuit.

The temperature compensating circuit just described has particular application when the voltage produced by the main power source is a variable as it is in the disclosed expandor circuit. At low levels the effect of $I_E$ is small because the amplification factor $\alpha$ is less than .5 at collector voltages of a few millivolts. However, as the collector voltage rises with level, the current amplification factor $\alpha$ increases to greater than .9 causing the $\alpha I_E$ component of Equation 1 to increase and thus give greater compensation to the higher signal levels. The characteristic of $I_{co}$ without benefit of the amplification caused by $I_E$ and the shaping of resistors 37, 38, and 39 is almost sufficient to correct errors at low signal levels for temperatures above 25° C. However, below 25° C., it is necessary to utilize the amplification of $I_E$ to reduce the compensating current flow through the load as the temperature increases from the minimum value at which it is necessary to provide the full compensating current flow. R39 is included in the circuit to provide emitter degeneration and thus prevent over-compensation at high ambient temperatures.

For a given signal input, an essentially constant output is obtained from the illustrated variolosser over a temperature range of —35° C. to +60° C. when the variolosser diodes are type HD2299, transistor 36 is type 2N44, and the various resistors used in the circuit have the following values:

| | |
|---|---:|
| Resistors 25 and 26 _____ ohms__ | 1200 |
| Resistors 28 and 29 _____ do____ | 51 |
| Resistors 32 and 35 _____ do____ | 39 |
| Resistor 40 _____ do____ | 430 |
| Resistor 41 _____ do____ | 22 |
| Resistor 37 _____ megohms__ | 3.9 |
| Resistor 38 _____ ohms__ | 1200 |
| Resistor 39 _____ do____ | 5100 |

While there has been shown and described what at present is considered to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In combination, a load circuit having an impedance which decreases with increases in ambient temperature, a power source for producing a current flow through said load circuit, a temperature compensating circuit, means in said compensating circuit for producing a compensating current flow through said load circuit which aids the current flow through said load circuit produced by said power source at low ambient temperatures, and means in said compensating circuit for reducing said compensating current flow through said load circuit to zero as the ambient temperature increases.

2. In combination, a load circuit having an impedance which decreases with increases in ambient temperature, a power source for producing a current flow through said load circuit, a temperature compensating circuit, means in said compensating circuit for producing a compensating current flow through said load circuit which aids the current flow through said load circuit produced by said power source at low ambient temperatures, means in said compensating circuit for reducing said compensating current flow through said load circuit to zero as said ambient temperature increases and means for then reducing the current flow through said load circuit produced by said power source as said ambient temperature further increases.

3. In combination, a load circuit having first and second terminals, said load circuit having an impedance between said first and second terminals which decreases with increases in ambient temperature, a first source of potential, means for connecting said first source of potential across said first and second terminals, means for returning said second terminal to a point of reference potential, a second source of potential, means for connecting said second source of potential between said first terminal and said point of reference potential, the terminals of said first and second sources of potential connected to said first terminal being of like polarity, a semiconductor junction device, and means for connecting said device between said point of reference potential and said first terminal with said device being so poled that it is biased in the reverse direction in said connection.

4. In combination, a load circuit having first and second terminals, said load circuit having an impedance between said first and second terminals which decreases with increases in ambient temperature, a first source of potential, means for connecting said first source of potential across said first and second terminals, means for returning said second terminal to a point of reference potential, a second source of potential, means for connecting one terminal of said second source of potential to said point of reference potential, means for connecting the other terminal of said second source of potential through a resistive element to said first terminal, the terminals of said first and second sources of potential connected to said first terminal being of like polarity, a transistor having a base, an emitter, and a collector, means for returning said base through a resistive element to said point of reference potential, means for returning said emitter through a resistive element to said point of reference potential, and means for connecting said collector to said first terminal.

5. An electrical wave transmission system comprising a variolosser having a pair of signal input terminals and a pair of output terminals, said variolosser comprising first and second unidirectional conducting devices the conductivity of which increases with increases in ambient temperature, means for connecting said first device between one of said input terminals and one of said output terminals, means for connecting said second device between the other one of said input terminals and the other one of said output terminals, control means for producing a forward current flow through said devices which is proportional to the volume of the signals applied to said input terminals, a temperature compensating circuit, means in said compensating circuit for producing a compensating current flow through said devices which aids the current flow through said devices produced by said control means at low ambient temperatures, and means in said compensating circuit for reducing said compensating current flow through said devices as said ambient temperature increases.

6. An electrical wave transmission system comprising a variolosser having a pair of signal input terminals and a pair of output terminals, said variolosser comprising first and second unidirectional conducting devices the conductivity of which increases with increases in ambient temperature, means for connecting said first device between one of said input terminals and one of said output terminals, means for connecting said second device between the other one of said input terminals and the other one of said output terminals, control means for producing a forward current flow through said devices which is proportional to the volume of the signals applied to said input terminals, a temperature compensating circuit, means in said compensating circuit for producing a compensating current flow through said devices which aids the current flow through said devices produced by said control means at low ambient temperatures, and means in said compensating circuit for reducing said compensating current flow through said devices to zero as said ambient temperature increased and for then reducing the current flow through said devices produced by said control means as said ambient temperature further increases.

7. An electrical wave transmission system comprising a transmission line, a variolosser having a pair of input terminals and a pair of output terminals, and variolosser comprising first and second unidirectional conducting devices the conductivity of which increases with increases in ambient temperature, means for connecting said first device between one of said input terminals and one of said output terminals, means for connecting said second device between the other one of said input terminals and the other one of said output terminals, a first pair of resistive elements connected in series between said input terminals, a second pair of resistive elements connected in series between said output terminals, a control circuit means for coupling signals appearing on said transmission line to said input terminals and to said control circuit, means in said control circuit for rectifying signals coupled thereto and for applying the resulting rectified signals across the junction points of said first and second pairs of resistive elements in a direction to produce a forward current through said devices, means for returning said other one of said output terminals to a point of reference potential, a source of potential, means for connecting said source of potential between said point of reference potential and the junction point of said first pair of resistive elements, said source of potential being of a polarity to also produce a forward current through said devices, a semiconductor junction device, and means for connecting said semiconductor junction device between said point of reference potential and the junction point of said first pair of resistive elements, said semiconductor device being so poled that it is biased in the reverse direction in said connection.

8. An electrical wave transmission system comprising a transmission line, a variolosser having a pair of input terminals and a pair of output terminals, said variolosser comprising first and second unidirectional conducting devices, means for connecting said first device between one of said input terminals and one of said output terminals, means for connecting said second device between the other one of said input terminals and the other one of said output terminals, a first pair of resistive elements connected in series between said input terminals, a second pair of resistive elements connected in series between said output terminals, a control circuit, means for coupling signals appearing on said transmission line to said input terminals and to said control circuit, means in said control circuit for rectifying signals coupled thereto and for applying the resulting rectified signals across the junction points of said first and second pairs of resistive elements in a direction to produce a forward current flow through said devices, means for returning said other one of said output terminals to a point of reference potential, a source of potential, means for connecting said source of potential between said point of reference potential and the junction point of said first pair of resistive elements, said source of potential being of a polarity to also produce a forward current flow through said devices, a transistor having a base, an emitter, and a collector, means for returning said base through a resistive element to said point of reference potential, means for returning said emitter through a resistive element to said point of reference potential, and means for connecting said collector to the junction point of said first pair of resistive elements.

References Cited in the file of this patent

UNITED STATES PATENTS

| | | |
|---|---|---|
| 2,164,344 | Norwine | July 4, 1939 |
| 2,693,572 | Chase | Nov. 2, 1954 |